(12) United States Patent
Liu et al.

(10) Patent No.: US 10,868,590 B2
(45) Date of Patent: Dec. 15, 2020

(54) MASSIVE MIMO ARRAY ANTENNA

(71) Applicant: AAC Technologies Pte. Ltd., Singapore (SG)

(72) Inventors: Jianchuan Liu, Shenzhen (CN); Yuehua Yue, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 22 days.

(21) Appl. No.: 16/524,212

(22) Filed: Jul. 29, 2019

(65) Prior Publication Data

US 2020/0044698 A1 Feb. 6, 2020

(30) Foreign Application Priority Data

Aug. 3, 2018 (CN) .......................... 2018 1 0875694

(51) Int. Cl.
*H04B 7/0452* (2017.01)
*H01Q 21/06* (2006.01)
*H01Q 1/22* (2006.01)

(52) U.S. Cl.
CPC ......... *H04B 7/0452* (2013.01); *H01Q 1/2283* (2013.01); *H01Q 21/061* (2013.01)

(58) Field of Classification Search
None
See application file for complete search history.

(56) References Cited

U.S. PATENT DOCUMENTS

| 2018/0337461 A1* | 11/2018 | Kildal | ............... H01Q 21/24 |
| 2019/0319364 A1* | 10/2019 | Yang | ............... H01Q 21/065 |
| 2019/0326675 A1* | 10/2019 | Kim | ............... H01Q 9/0485 |
| 2020/0212591 A1* | 7/2020 | Liu | ............... H01Q 9/045 |

* cited by examiner

Primary Examiner — Jany Richardson
(74) Attorney, Agent, or Firm — W&G Law Group LLP

(57) ABSTRACT

The present disclosure provides a massive MIMO array antenna comprising a PCB substrate and a plurality of antenna groups, each of the antenna groups comprises two feeding networks and one antenna unit, each antenna unit comprises an antenna bracket, a radiating piece and four coupling pieces, each of the feeding networks is electrically connected to two of the coupling pieces and performs coupling differential feeding on the radiating pieces by the two coupling pieces, each of the antenna groups is ±45° orthogonal polarization.

10 Claims, 7 Drawing Sheets

US 10,868,590 B2

MASSIVE MIMO ARRAY ANTENNA

TECHNICAL FIELD

The present disclosure relates to the field of antenna technologies, and in particular, to a massive MIMO array antenna.

BACKGROUND

The Ministry of Industry and Information Technology of the People's Republic of China has planned the following four frequency bands for China's 5G technology R&D trials: 3.3-3.6 GHz band, 4.8-5.0 GHz band, 24.75-27.5 GHz band, and 37-42.5 GHz band. It fully reflects the government's determination on supporting 5G international standards and technology verification and accelerating the development of 5G industry. Massive MIMO is undoubtedly one of the most critical technologies in 5G systems.

The use of massive antennas could significantly increase spectrum efficiency, especially when the capacity is required to be large or the coverage is wide, and it enables 4G networks to meet the requirement for network growth. From the operator's point of view, this technology has a good prospect, and thus it should be implemented in. 5G hardware in advance, and provide a 5G air interface function by software upgrade, so as to promote 5G deployment.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. To those skilled in the art, other drawings can be obtained according to these drawings without any creative work, wherein.

DETAILED DESCRIPTION

The technical solutions in the embodiments of the present disclosure will be clearly and completely described in conjunction with the drawings in the embodiments of the present disclosure. It is obvious that the described embodiments are just a part but not all of the embodiments of the present disclosure. All other embodiments obtained by those skilled in the art based on the embodiments of the present disclosure without creative efforts would fall within the scope of the present disclosure.

Figure 1:
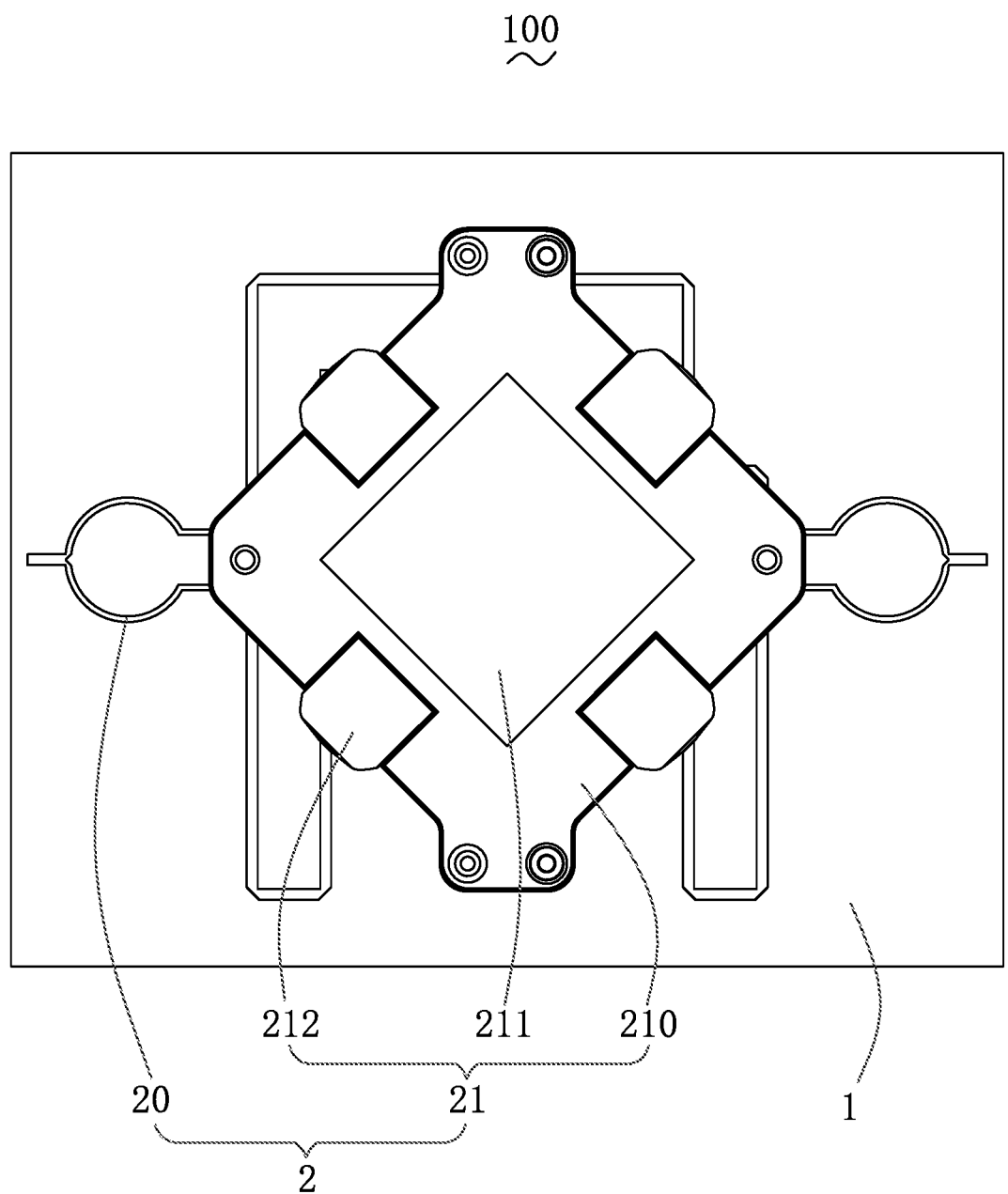
FIG. 1 is a top view illustrating the structure of a massive MIMO array antenna according to the present disclosure.
Figure 2:
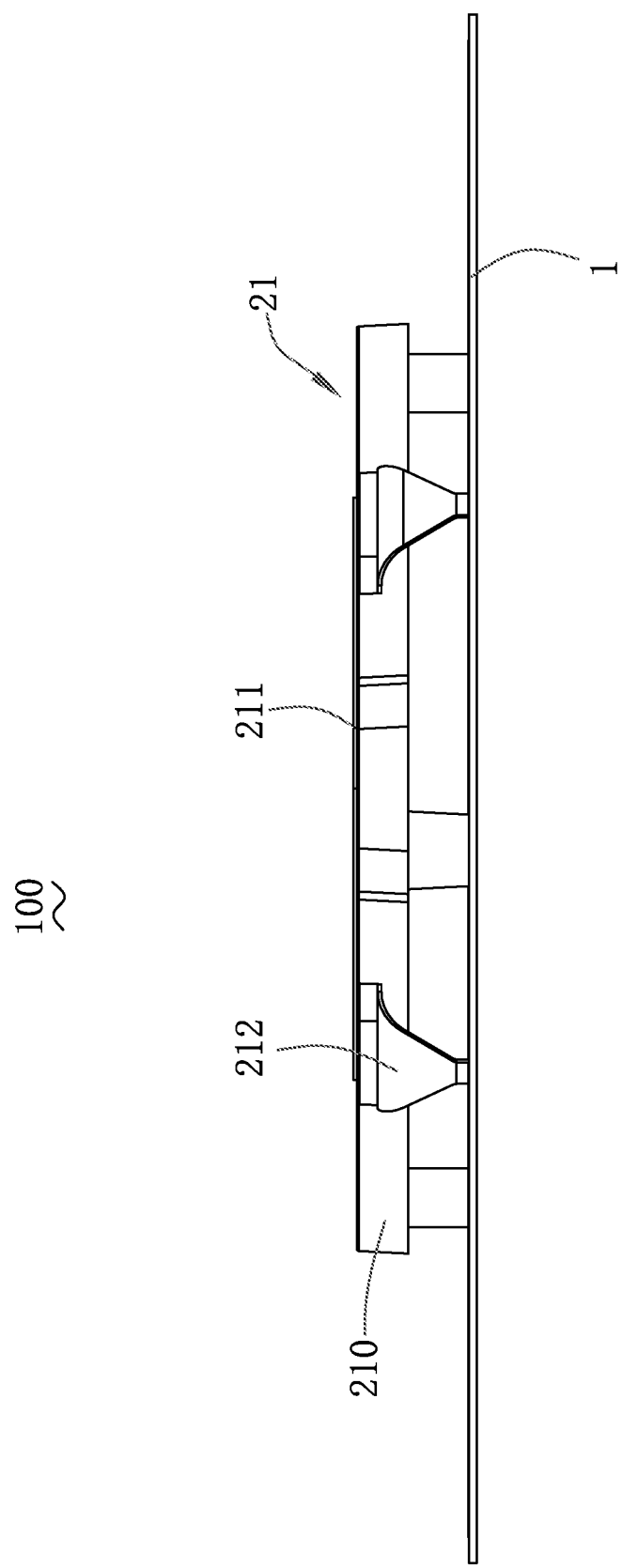
FIG. 2 is a side view illustrating the structure of a massive MIMO array antenna according to the present disclosure.
Figure 3:
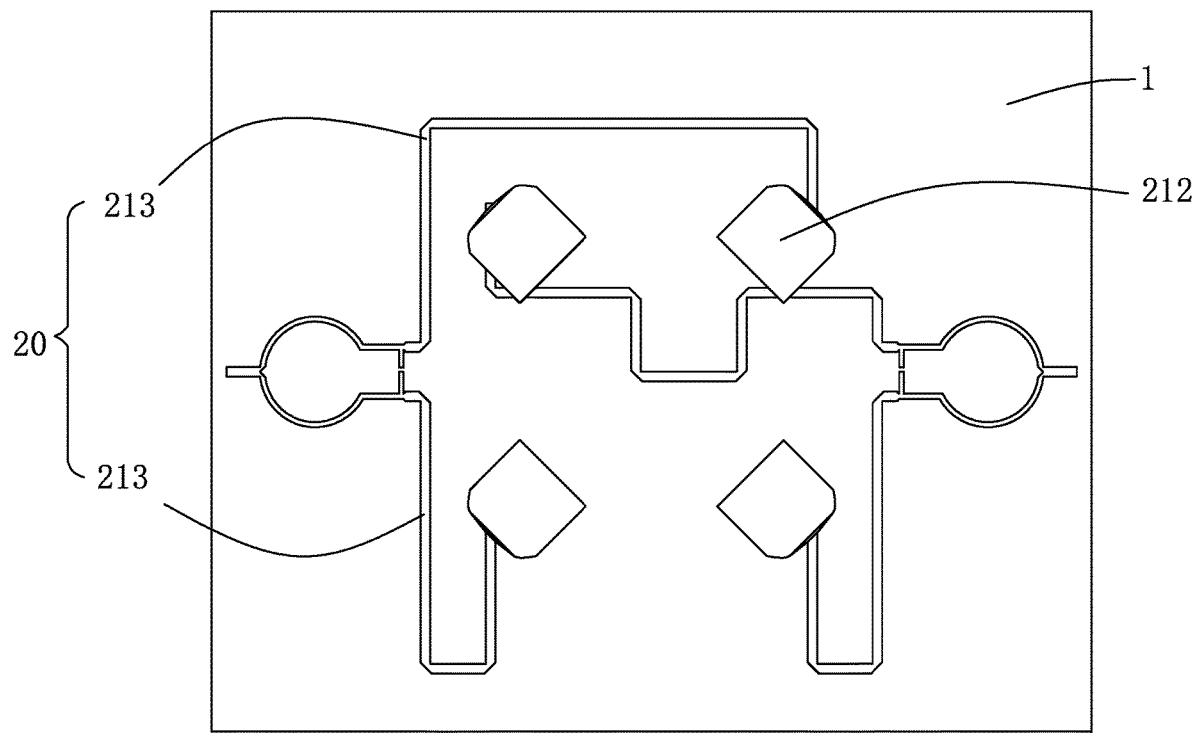
FIG. 3 is a schematic diagram illustrating a connection structure of a coupling piece and a feeding network in a massive MIMO array antenna according to the present disclosure.

Referring to FIGS. 1 to 3, an embodiment of the present disclosure provides a massive MIMO array antenna 100 with an operating frequency band of 3.4-3.6 GHz or 4.8-5 GHz, which is suitable for the 5G mobile communication system. The massive MIMO array antenna 100 comprises a PCB substrate 1 and a plurality of antenna groups 2 disposed on the PCB substrate 1. The number of the antenna groups 2 is an even number, and the even number of antenna groups 2 are spaced apart from each other on the PCB substrate 1 with equal intervals, each of the antenna groups 2 achieves a ±45° orthogonal polarization. It should be noted that the operating frequency band of the massive MIMO array antenna 100 depends on a size of antenna, and the size could be adjusted according to application requirements so as to achieve the corresponding operating frequency band, and it is not limited to 3.4-3.6 GHz or 4.8-5 GHz.

Each of the antenna groups 2 comprises two feeding networks 20 and one antenna unit 21, and the feeding networks 20 are configured for feeding the antenna unit 21. The antenna unit 21 comprises an antenna bracket 210 fixed to the PCB substrate 1, a radiating piece 211 disposed at a center of the antenna bracket 210, and four coupling pieces 212 disposed on the antenna bracket 210 and located outside the periphery of the radiating piece 211. The coupling pieces 212 is spaced apart from and coupled to the radiating piece 211. Each of the feeding networks 20 is electrically connected to the two coupling pieces 212 and performs coupling differential feeding on radiating piece 211 by the two coupling pieces 212, so that the antenna isolation degree of the antenna unit 21 could be effectively improved.

The two coupling pieces 212 connected to each of the feeding networks 20 correspond to two opposite sides of the radiating piece 211. Each of the feeding networks 20 comprises two feeding branches 213 disposed on the PCB substrate 1, and each of the feeding branches 213 is connected to one of the coupling pieces 212, and difference of the phases fed to the coupling pieces 212 by the two feeding branches 213 is 180°.

Figure 4:
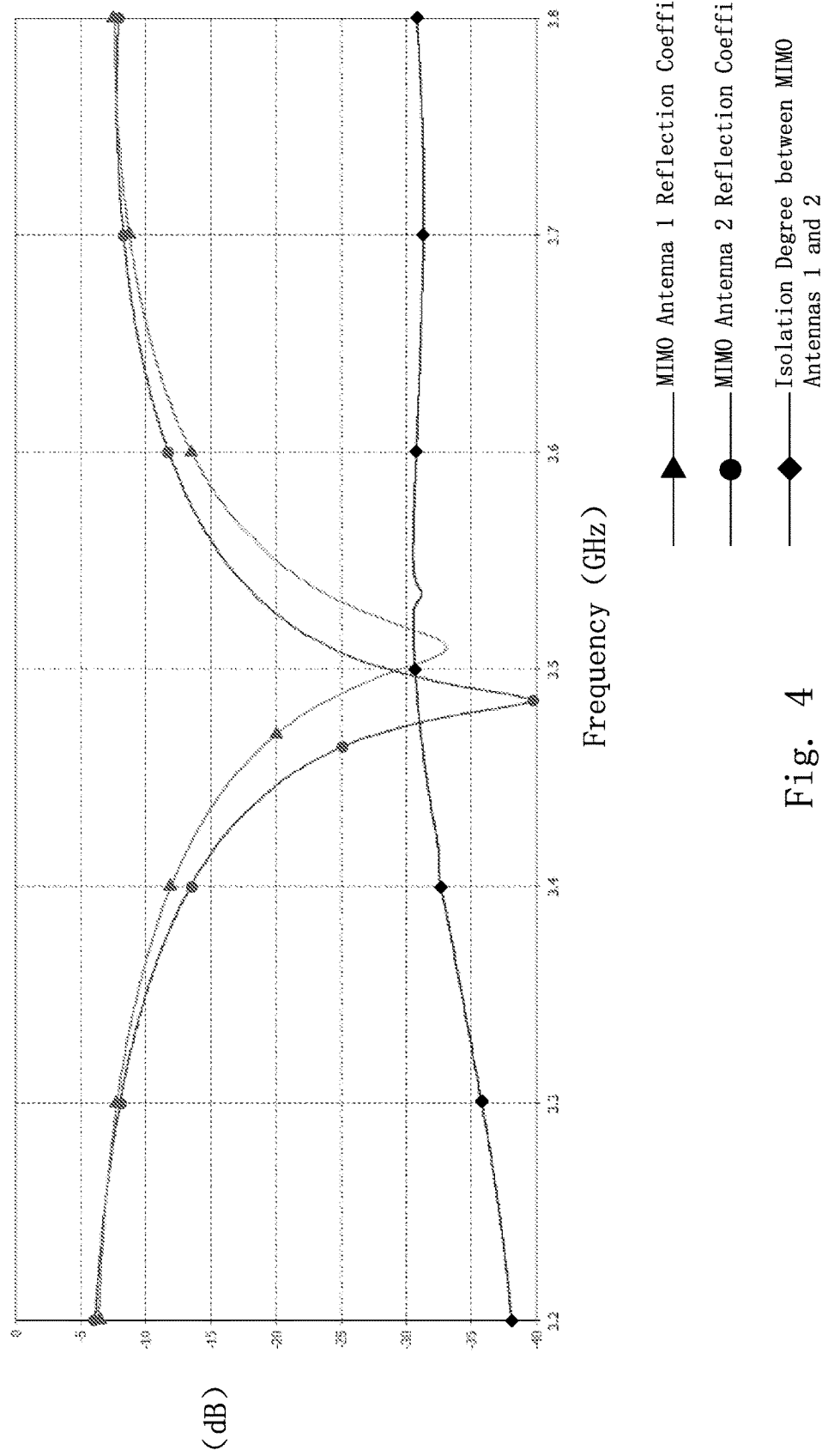
FIG. 4 is a diagram illustrating the reflection coefficient and isolation degree of two MIMO antennas of a massive MIMO array antenna according to the present disclosure.

The four coupling pieces 212 are divided into two groups and each group includes two coupling pieces, and a coupling differential feeding is performed on radiating piece 211 by each group of the coupling pieces respectively, and each group of the coupling pieces 212 form one MIMO antenna together with the radiating piece 211. Therefore, when there are four coupling pieces 212, the antenna unit 20 has two MIMO antennas. Referring to FIG. 4, the antenna isolation degree of the two MIMO antennas could reach −30 db or less. Thus, the present disclosure provides a good antenna isolation degree for the antenna unit 20 by adopts a coupling differential feeding.

The radiating piece 211 has a rectangular shape, and the four coupling pieces 212 are respectively disposed corresponding to the four sides of the radiating piece 211, where, the two coupling pieces 212 of each group (each group includes two coupling pieces) are disposed on opposite sides of the radiating piece 211 to achieve ±45° orthogonal polarization, and one antenna group 2 could simultaneously implement transceiving and 2×2 MIMO antennas.

Figure 5A:
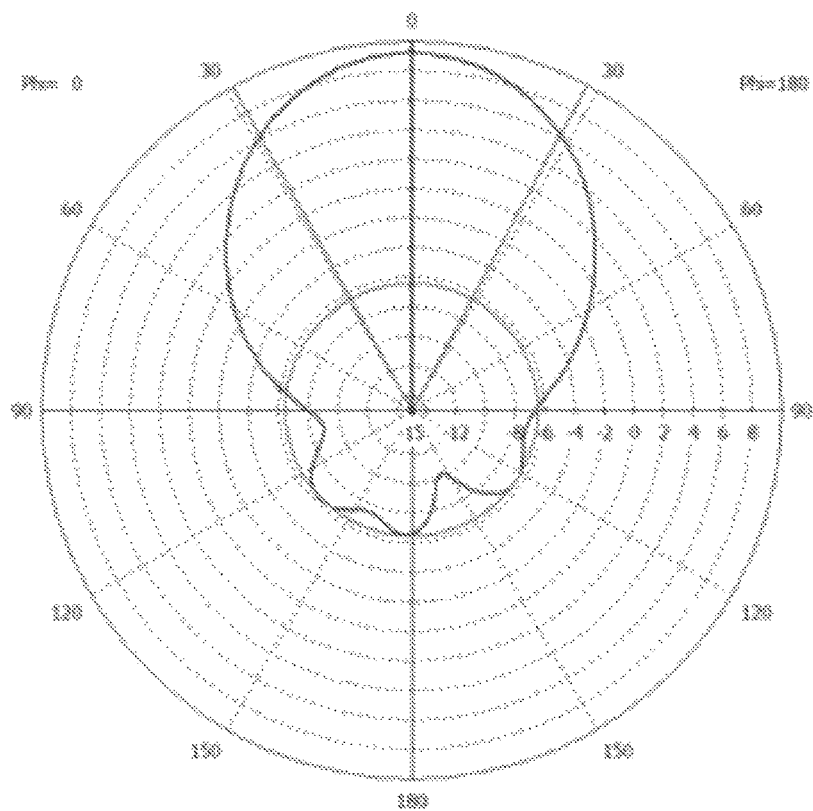
FIGS. 5(a) and 5(b) are diagrams illustrating the radiation direction of an antenna unit in a massive MIMO array according to the present disclosure.
Figure 5B:
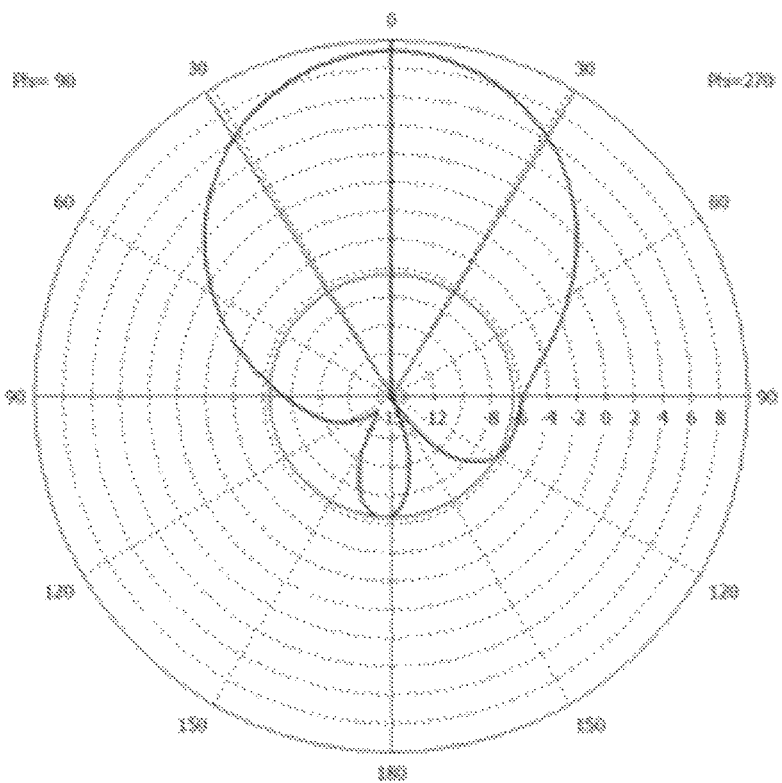

The radiation directions of the massive MIMO array antenna 100 are shown in FIGS. 5(a) and 5(b).

Figure 6:
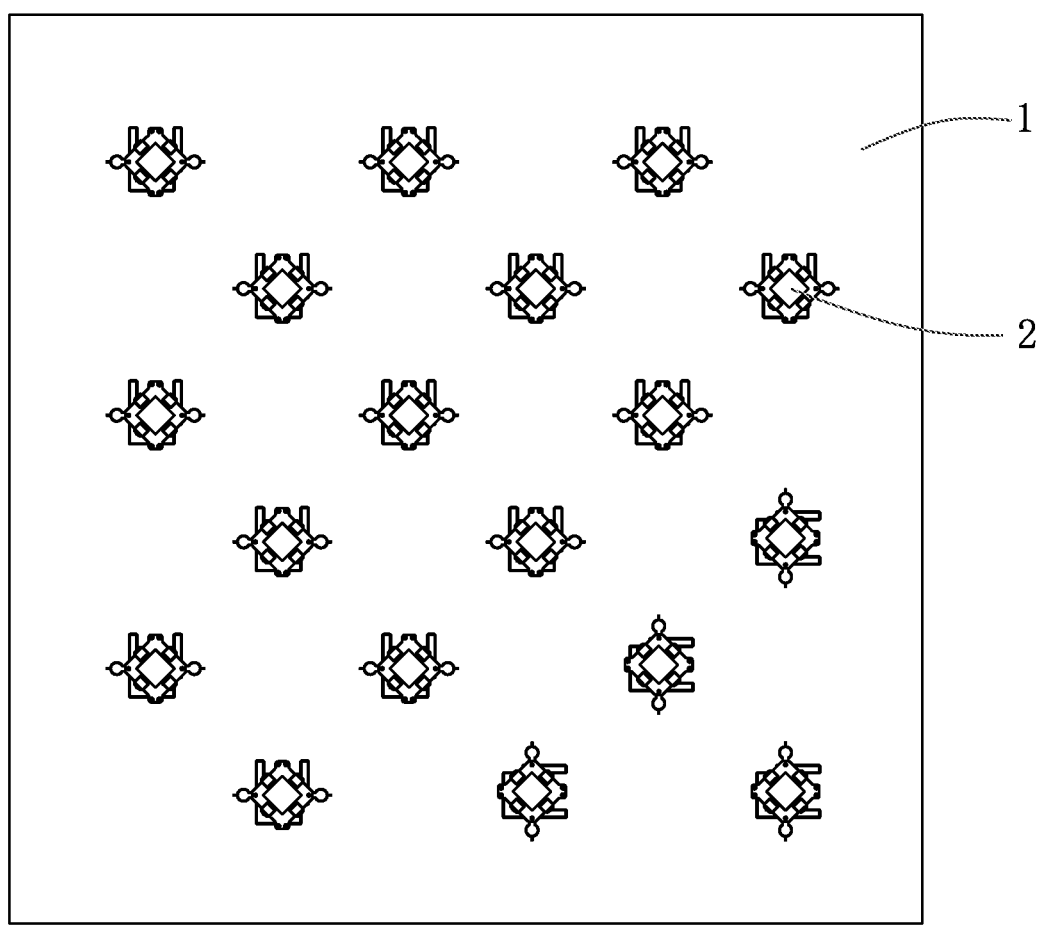
FIG. 6 is a schematic diagram illustrating an array of antenna units on a PCB substrate in a massive MIMO array antenna according to the present disclosure.
Figure 7:
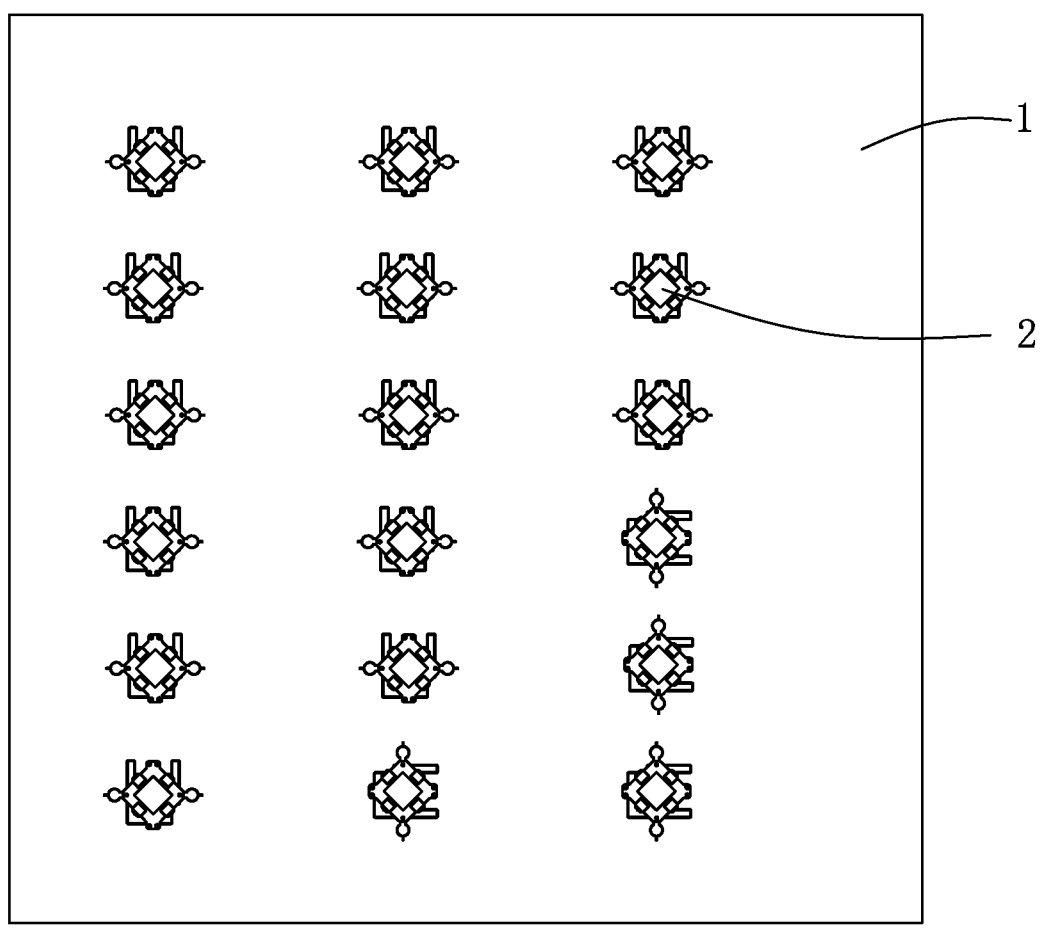
FIG. 7 is another schematic diagram illustrating an array of antenna units on a PCB substrate in a massive MIMO array antenna according to the present disclosure.

Referring to FIG. 6, since the massive MIMO array antenna 100 provided by the present disclosure has a simple structure, a plurality of the antenna groups 2 could be arranged on the PCB substrate 1 in a manner of a massive array. In FIG. 6, there are a total of 18 antenna groups 2, each of the antenna groups 2 achieves ±45° orthogonal polarization, thus 36 signal transmission paths are achieved. Of course, the present application does not limit the number of antenna groups 2, and in other embodiments, the number of antenna groups 2 could be selected according to installation environments, i.e., performance requirements. In addition, in FIG. 6, in order to save space, each column of antenna groups 2 are staggered. In other embodiments, each column of antenna groups 2 may also be aligned, such as the massive MIMO array antenna 200 in FIG. 7.

Compared with the related art, the massive MIMO array antenna provided by the present disclosure has at least one of the following beneficial effects:

1) By adopting coupling differential feeding, the antenna isolation degree of the antenna unit is good;

2) An orthogonal ±45° polarization is achieved, so that one antenna group could implement transceiving as well as 2×2 MIMO;

3) The antenna has high gain and good performance;

4) The structure is simple and easy to implement massive antenna array layout;

5) The spectral efficiency is high, The network coverage is flexible and the capacity gain is significant high.

The above is only embodiments of the present disclosure, and it should be noted that those skilled in the art can make improvements without departing from the concept of the present disclosure, but these improvements all fall in the protection range of the present disclosure.

What is claimed is:

1. A massive MIMO array antenna comprising a PCB substrate and a plurality of antenna groups disposed on the PCB substrate, wherein, each of the antenna groups comprises two feeding networks and one antenna unit, and the feeding network is configured for feeding the antenna unit, wherein, each antenna unit comprises an antenna bracket fixed to the PCB substrate, a radiating piece disposed on the antenna bracket, and four coupling pieces disposed on the antenna bracket and located outside a periphery of the radiating piece, each of the feeding networks is electrically connected to two of the coupling pieces and performs coupling differential feeding on the radiating piece through the coupling pieces, and each of the antenna groups is ±45° orthogonally polarized.

2. The massive MIMO array antenna according to claim 1, wherein the radiating piece has a rectangular shape, and the four coupling pieces are respectively disposed corresponding to four sides of the radiating piece.

3. The massive MIMO array antenna of claim 2, wherein the two of the coupling pieces connected to each of the feeding networks correspond to two opposite sides of the radiating piece.

4. The massive MIMO array antenna according to claim 3, wherein each of the feeding networks comprises two feeding branches disposed on the PCB substrate, each of the feeding branches is connected to one of the coupling pieces, and the difference of the phases fed to the coupling pieces by the two feeding branches are 180°.

5. The massive MIMO array antenna according to claim 1, wherein the antenna unit has an operating frequency band of 3.4-3.6 GHz or 4.8-5 GHz.

6. The massive MIMO array antenna according to claim 1, wherein the plurality of antenna groups are spaced apart from each other on the PCB substrate with equal intervals.

7. The massive MIMO array antenna according to claim 6, wherein a plurality of the antenna groups form a planar array on the PCB substrate.

8. The massive MIMO array antenna according to claim 7, wherein each two adjacent columns of the antenna groups of the planar array are staggered.

9. The massive MIMO array antenna according to claim 7, wherein each two adjacent columns of the antenna groups of the planar array are aligned.

10. The massive MIMO array antenna of claim 1, wherein the massive MIMO array antenna is one of MIMO.

* * * * *